April 28, 1970

T. H. PEDERSEN 3,509,368

CIRCUIT FOR EXTENDING THE LINEAR OPERATING
RANGE OF LOG AMPLIFIERS

Filed April 26, 1967

INVENTOR
THOMAS H. PEDERSEN
BY
Charles F3 Curry

April 28, 1970     T. H. PEDERSEN     3,509,368
CIRCUIT FOR EXTENDING THE LINEAR OPERATING
RANGE OF LOG AMPLIFIERS
Filed April 26, 1967     4 Sheets-Sheet 4

INVENTOR
THOMAS H. PEDERSEN
BY

United States Patent Office 3,509,368
Patented Apr. 28, 1970

3,509,368
CIRCUIT FOR EXTENDING THE LINEAR
OPERATING RANGE OF LOG AMPLIFIERS
Thomas H. Pedersen, Albany, Calif., assignor, by mesne assignments, to the United States of America as represented by the Secretary of the Navy
Filed Apr. 26, 1967, Ser. No. 634,808
Int. Cl. G06g 7/12
U.S. Cl. 307—230                           3 Claims

ABSTRACT OF THE DISCLOSURE

A logarithm amplifier comprising a preamplifier limiter circuit that drives two 50 db logarithmic channels the outputs of which are added. One of the logarithmic channels operates from −100 db to −50 db and is then held constant by the preamplifier limiter with further increase in the input signal. The other logarithmic channel receives a 50 db smaller signal from the preamplifier limiter and begins to operate only after −50 db is reached. The outputs of the two logarithmic channels are added which then provide a complete 100 db response.

---

The invention described herein may be manufactured and used by or for the Government of the United States of America for governmental purposes without the payment of any royalties thereon or therefor.

The present invention relates to a logarithmic amplifier and more particularly to a precision, wideband logarithm amplifier of large dynamic range.

There have been many attempts to solve the problem of taking the ratio of two simultaneous microwave pulses. One way to obtain this ratio is to detect each pulse individually and apply them to suitable logarithmic amplifiers. The two amplifier outputs can then be subtracted, giving the logarithm of the ratio of the two input pulses. An antilogarithm circuit can then be used to obtain the ratio. However, the difficulty in this approach is that the electrical requirements imposed upon the logarthmic amplifiers are severe. These requirements are a dynamic range of about 100 db, rise times of less than 0.1 μsec., and accuracies on the order of ±1 db. In addition, the desired amplitude response of each amplifier is not actually logarithmic since the characteristics of the detector will modify the response. What is desired from the output of each amplifier is a pulse with an amplitude proportional to the logarithm of the input radio frequency power. A typical detector, however, is square law or logarithmic for weak signals only and approaches linear behavior when the input power is large. Thus the amplifier itself must compensate for the change in detector characteristics in order for the overall response to be logarithmic. This amplifier compensation is very difficult to achieve.

Accordingly, an object of the present invention is to overcome these difficulties by providing a logarithm amplifier that dynamically operates the individual detectors within their logarithmic range and yet has an overall dynamic range that exceeds the logarithmic range of the individual detectors. In addition, the logarithm amplifier of the present invention has the capability of compensating for the particular characteristics of the individual detectors.

Briefly, the present invention comprises two 50 db logarithmic channels (channels I and II) which are driven by a pre-amplifier limiter and the outputs of the two logarithmic channels are then applied to an adder circuit. In the range of input signals applied to the pre-amplifier of from −100 db to −50 db, logarithmic channel I operates over its normal dynamic range and therefore produces a straight line amplitude response when plotted as a function of the input signal in db. When the input signal to the pre-amplifier reaches −50 db, the pre-amplifier limits and the output of the logarithmic channel I therefore remains constant for any further increase of input signal. Logarithmic channel II receives its input from the pre-amplifier at a level that is 50 db smaller than that of logarithmic channel I. As a result the signal applied to the input of logarithmic channel II is approximately zero when the input signal to the pre-amplifier is from −100 db to −50 db. When −50 db is reached, logarithmic channel II will then begin to operate within its logarithmic dynamic range. The output of logarithmic channel I is then added to the output of logarithmic channel II which then provides a complete 100 db response. This particular arrangement has two logarithmic channels; however, more logarithm channels could be added to extend the dynamic range or to increase the overall accuracy. Another important feature of the present invention is the base of the logarithm, which determines the slope of the db curve, is adjustable at the −50 db crossover point. This feature provides compensation for the detector when the detector passes from square law operation to linear.

Other objects, advantages and novel features of the invention will become apparent from the following detailed description of the invention when considered in conjunction with the accompanying drawings wherein.

Figure 1:
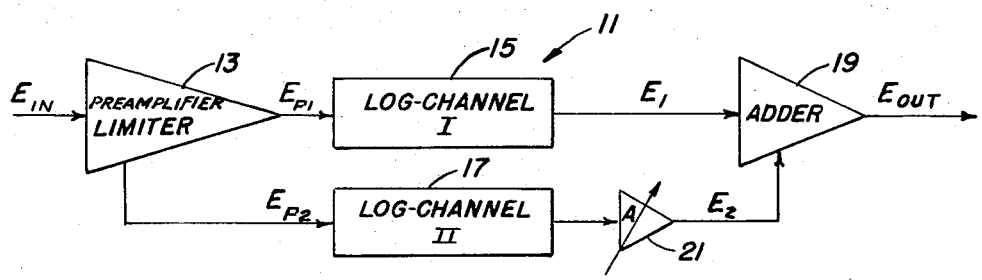
FIG. 1 is a block diagram of the overall logarithmic amplifier of the present invention.

In FIG. 1 is illustrated a block diagram of logarithmic amplifier 11 of the present invention. This logarithmic amplifier has an input signal $E_{in}$ applied to the input of preamplifier-limiter 13 which has two outputs, $E_{p1}$ and $E_{p2}$, that are respectively applied to the inputs of log-channel I and log-channel II respectively referred to by reference numbers 15 and 17. The output signal $E_1$ of log-channel I is applied to the input of adder 19. The output signal $E_2$ of log-channel II is applied to the input of adder 19. The output of adder 19 is indicated as $E_{out}$.

Figure 2A:
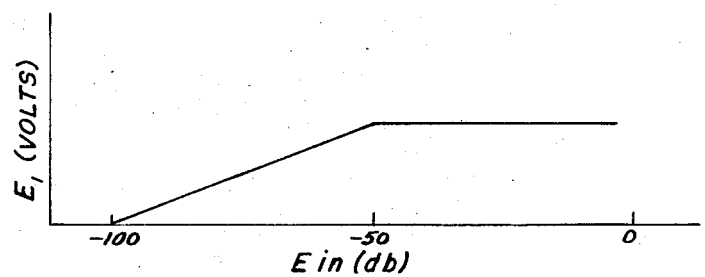
FIGS. 2A, 2B and 2C are curves illustrating the output voltages of log-channels I and II and the adder of the logarithm amplifier of FIG. 1 over a dynamic range of 100 db.
Figure 2B:
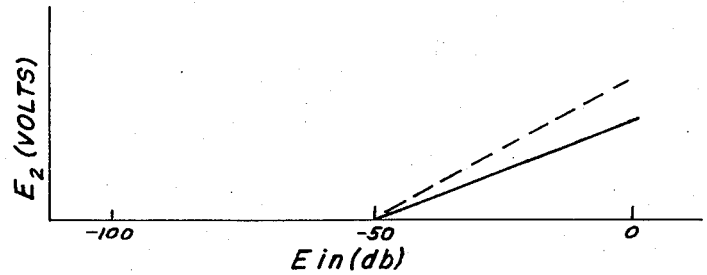
Figure 2C:
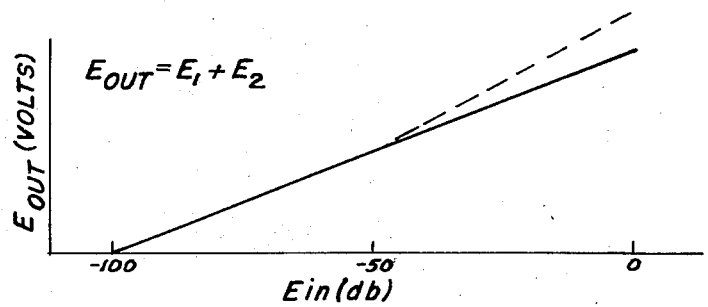

Referring to FIGS. 2A, 2B and 2C, $E_1$ is the output voltage of log-channel I, $E_2$ is the output voltage of log-channel II, $E_{out}$ is the output voltage of adder 19 and $E_{in}$ is the input to preamplifier-limiter 13, in decibels. As illustrated in FIG. 2A, in the range of input signals from −100 db to −50 db, log-channel I operates on the logarithmic portion of its dynamic range and therefore produces a straight-line response when plotted as a function of $E_{in}$ in decibels. When $E_{in}$ reaches −50 db, preamplifier-limiter 13 limits or prohibits a further increase of voltage $E_{p1}$ from being applied to the input of log-channel I even though there is a further increase in voltage $E_{in}$. As shown in FIG. 2B, log-channel II receives its input voltage $E_{p2}$ from the preamplifier at a level 50 db lower than log-channel I. A threshold circuit in log-channel II maintains $E_2$ equal to zero until $E_{in}$ reaches −50 db. When $E_{in}$ reaches −50 db the threshold circuit is overcome and log-channel II operates over its logarithmic range from −50 db to 0 db as shown.

Next the output voltages $E_1$ and $E_2$ of log-channel I and log-channel II are combined in adder 19 to produce an output voltage $E_{out}$ that is truly logarithmic over the dynamic range of 100 db (−100 db to −0 db). This is achieved even though the logarithmic detector device in log-channels I and II are logarithmic over a dynamic range of only 50 db. A gain control amplifier is provided in log-channel II for adjusting the slope of the output of log-channel II. This is necessary since the operating characteristics of the logarithmic detector devices in log-channels I and II may not match. The dotted line in FIG. 2B illustrates the slope of $E_2$ when the detector in log-channel II has a greater slope than the detector in log-channel I. This would provide an adder output voltage $E_{out}$ as illustrated by the dotted line curve in FIG. 2C. This condition is corrected to the solid curves of FIGS. 2B and 2C by a gain control amplifier in log-channel II thereby producing a curve having a constant slope throughout the entire 100 db dynamic range.

Since each log-channel is capable of producing a dynamic range of about 50 db alone, when the two are combined a logarithmic amplifier with a dynamic range of 100 db results. This technique is considered quite advantageous to obtain a 100 db response even though each log-channel employs a single diode having a 100 db response. This is because practical circuit considerations such as diode capacity, stray capacity, transistor impedance levels and the like will restrict the dynamic range of a diode to about 50 db when accuracies of ±1 db and short rise times are required. The basic reason why this technique does not reduce the speed of response when both channels are combined is that the output of both channels are additive and when two 0.1-μsec. pulses are added, the result is still a 0.1-μsec. pulse.

Figure 3:
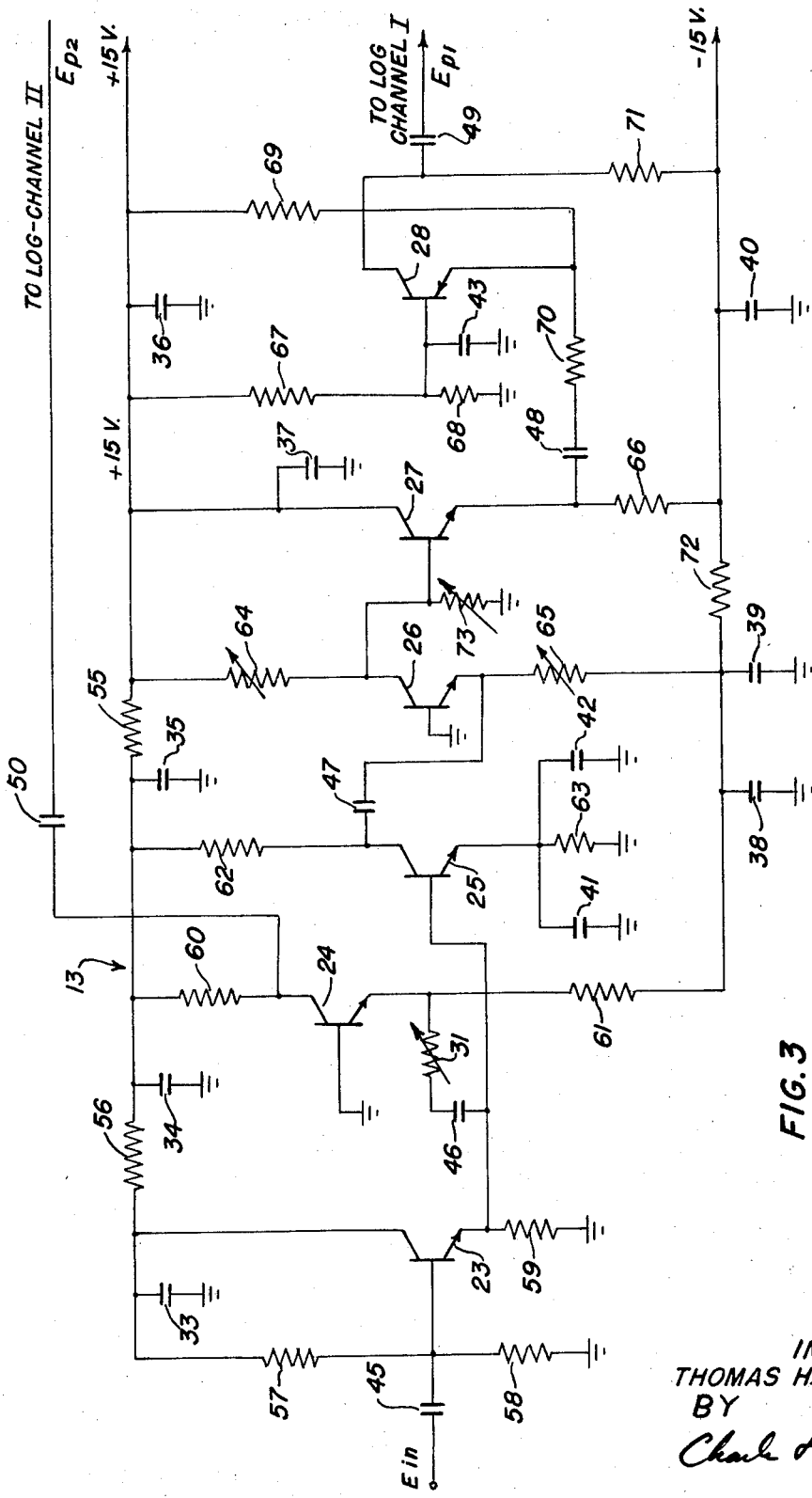
FIG. 3 is a schematic diagram of the preamplifier-limiter circuit in FIG. 1.

In FIG. 3 is schematically illustrated the preamplifier-limiter 13 of FIG. 1 of the present invention. The preamplifier limiter is a six-transistor circuit that amplifies the input signal $E_{in}$ to suitable signal levels, $E_{p1}$ and $E_{p2}$, for the log-channels I and II, respectively. The input signal $E_{in}$, that is processed by preamplifier limiter 13 for transmission to log-channel I, passes through transistors 23, 25, 26, 27, and 28 and appears as an output signal $E_{p1}$. The output signal $E_{p1}$ is limited by the preamplifier-limiter from increasing in value after −50 db has been reached. The input signal $E_{in}$ is also processed by the preamplifier limiter for transmission to log-channel II and passes only through transistors 23 and 24 and appears as an output signal $E_{p2}$. Signal $E_{p2}$ is 50 db smaller than signal $E_{p1}$ which is controlled by the selected value of resistor 31. Resistor 31 is preferably made adjustable in order to readily vary the amplitude of the pulse applied to log-channel II.

Figure 4:
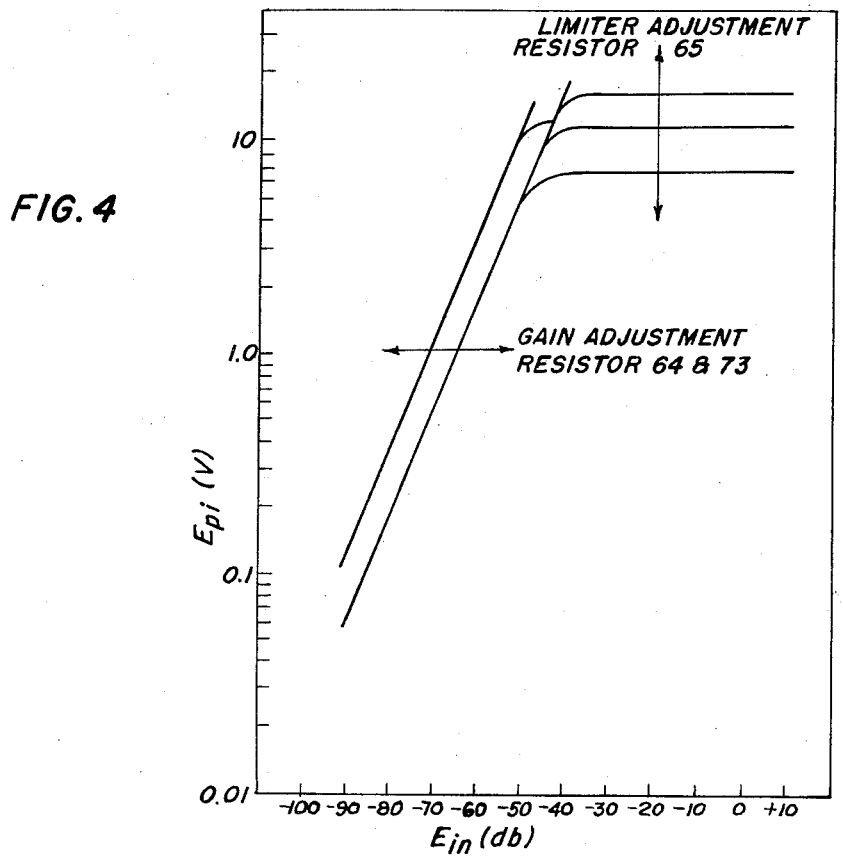
FIG. 4 shows a family of curves depicting the variations in gain and limiter cutoff which may be achieved by the preamplifier-limiter circuit of FIG. 3.

To prevent distortion of the characteristics of typical microwave detectors the input impedance of the preamplifier is made reasonably high, for example 10,000 ohms, by using transistor 23 in the emitter-follow configuration and transistor 25 in the common-emitter configuration. To obtain the desired "hard limiting" output characteristic of the preamplifier-limiter, transistors 25, 26 and 27 are operated beyond "cutoff" and in series so that 50 db limiting can be obtained without appreciably overdriving any of these transistors. Transistor 26 is operated in a common-base configuration to extend the frequency response of transistor 25 by terminating the collector of transistor 25 by a low impedance. Transistors 27 and 28 are respectively arranged in emitter-follower and common-base configurations and they provide the additional gain necessary to drive log-channel I. Capacitors 33 through 43 provide shorting to ground of the AC ripple or spikes that may appear in the DC supply. Capacitors 45 through 50 function as DC blocking capacitors. Resistors 55 through 72 set the operating points of the various transistors. The complete amplitude response of the preamplifier limiter output $E_{p1}$ is applied to log-channel I as shown in FIG. 4. Resistor 64 is adjustable to set the limiter threshold and resistors 64 and 73 are together adjustable to control the preamplifier gain. The effect of these adjustments on the output characteristics is shown in FIG. 4.

Figure 5:
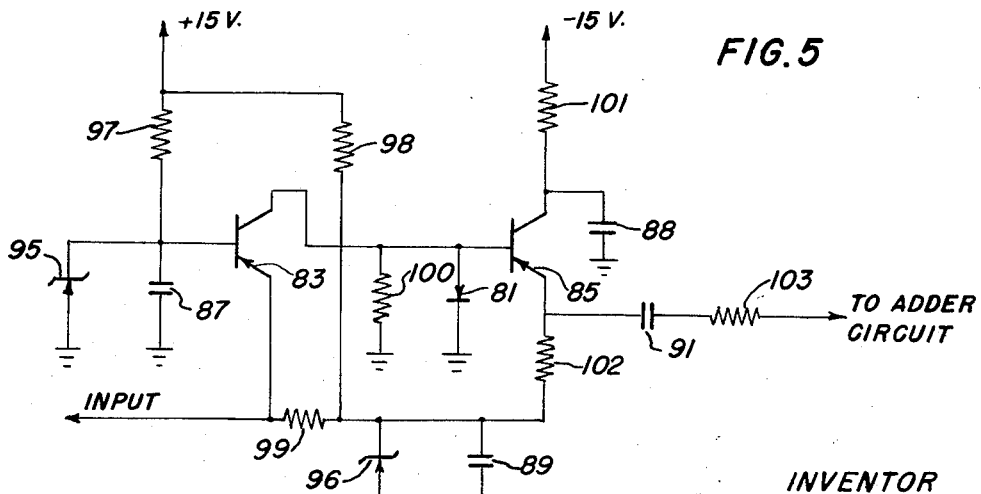
FIG. 5 is a schematic diagram of the log-channel I circuit of FIG. 1.
Figure 6:
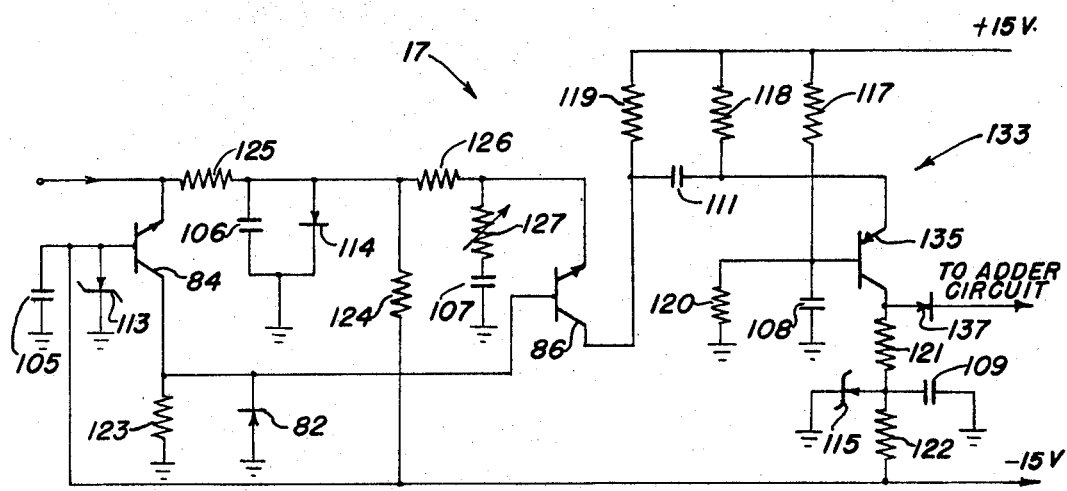
FIG. 6 is a schematic diagram of the log-channel II circuit of FIG. 1.

Referring now to FIGS. 5 and 6, each of the log-channels obtain their logarithmic response from a suitably operated diode. The use of diodes to obtain a logarithmic response is quite well known and is attributed to the exponential transfer characteristics possessed by many diodes. To obtain a logarithmic output from a diode, such as the "I N 903" diode, the input to the diode should be supplied from a high impedance source and the output obtained without loading the diode. This is accomplished in common-base configurations. Transistors 85 and 86 of shown in FIGS. 5 and 6, the high impedance source is obtained by driving diodes 81 and 82 of FIGS. 5 and 6, respectively, by transistors 83 and 84 which are arranged in common-base configurations. Transistor 85 and 86 of FIGS. 5 and 6 are arranged in emitter-follower configurations which, with their high input impedance, provide minimum loading effect on diodes 81 and 82.

Referring to FIG. 5, capacitors 87, 88 and 89 provide shunting to ground the AC ripple or spikes that may appear in the DC supply. Capacitor 91 functions as a DC blocking capacitor. Zener diodes 95 and 96 and resistors 97 through 102 set the operating points of transistors 83 and 85. Resistor 102 also functions to set the operating bias of diode 81. Resistor 103 functions to limit the current applied to the adder circuit of FIG. 7.

Referring to FIG. 6, capacitors 105 through 109 provide shunting to ground the AC ripple or spikes that may appear in the DC supply. Capacitor 111 functions as a DC blocking capacitor. Zener diodes 113, 114 and 115 and resistors 117 through 126 set the operating points of the transistors. Variable resistor 127 functions to adjust the gain of log-channel II.

From the above it can be seen that the log-channel II circuit of FIG. 6 is similar to the log-channel I circuit of FIG. 5 except that it accepts negative rather than positive input pulses. However, signal compatability is achieved since log-channel II inverts the pulse in transistor 86 to produce a positive output that corresponds with the positive output of log-channel I. In the log-channel II circuit there is provided a threshold circuit 133 including transistor 135 and diode 137. The purpose of the threshold circuit is to eliminate the linear portion of the log curve at the lower levels of its response by selecting the appropriate bias value for diode 137. Also the threshold circuit assists in tailoring log-channel II to the limiter characteristics of the preamplifier by appropriate selection of the bias and gain characteristics.

Gain control of log-channel II is achieved by adjusting the value of variable resistor 127 for the appropriate slope (see FIG. 2C), to match a detector or to match the slope of log-channel I. The slope adjustment is accomplished by controlling the gain of transistor 86 by resistor 127. Since the gain control follows the logarithmic operation of the diodes the effect is to control the slope of the logarithmic output.

Figure 7:
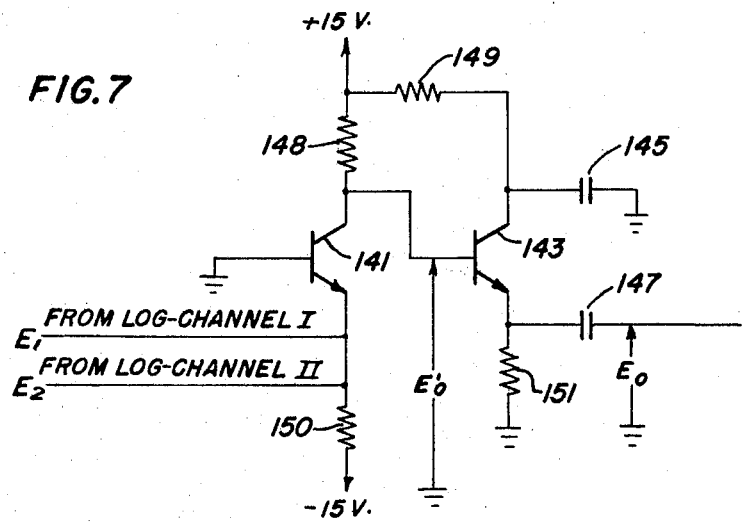
FIG. 7 is a schematic diagram of the adder circuit of FIG. 1.

In FIG. 7 is illustrated adder circuit 19 of logarithmic amplifier 11 of the present invention. The outputs, $E_1$ and $E_2$, of log-channels I and II are added by applying them to the emitter of transistor 141, which is arranged in a common-base configuration, of adder 19. Since the output impedances of both log-channels are at least an order of magnitude greater than the input impedance of transistor 141, the two log-channel outputs can be combined at the emitter of transistor 141. As a result of this combination, each of the log channel output voltages $E_1$ and $E_2$ are proportional to the sum of their output currents as required. Transistor 143 is connected in an emitter-follower configuration and allows the log-amplifier to be operated into load resistance as low as a few hundred ohms. Capacitor 145 provides shunting to ground of the AC ripple or spikes that may appear in the DC supply. Capacitor 147 is a DC blocking capacitor and resistors 148 through 151 set the operating points of transistors 141 and 143.

What is claimed is:
1. An amplifier comprising:
   a preamplifier having first, second, third, fourth, fifth, and sixth transistors;
   the emitter of said first transistor connected to the base of said third transistor and through a first variable resistor to the emitter of said second transistor;
   the collector of said third transistor connected to the emitter of said fourth transistor;
   the emitter of said fourth transistor connected through a second variable resistor to ground;
   the collector of said fouth transistor connected through a third variable resistor to a power source;
   the collector of said fourth transistor connected to the base of said fifth transistor;
   the base of said fifth transistor connected through a fourth variable resistor to ground;
   the emitter of said fifth transistor connected to the emitter of said sixth transistor;
   a first logarithmic circuit;
   the collector of said sixth transistor connected to the input of said first logarithmic circuit;
   a second logarithmic circuit;
   the collector of said second transistor connected to the input of said second logarithmic circuit;
   an adder circuit; and
   the output of said first and second logarithmic circuits connected to the input of said adder circuit.
2. The device of claim 1 wherein:
   said first logarithmic circuit includes first and second transistors and a diode;
   the collector of said first transistor connected to the base of said second transistor; and
   the anode of said diode connected ot the base of said second transistor and the collector of said diode connected to ground.
3. The device of claim 2 wherein:
   said second logarithmic circuit includes first, second and third transistors and a diode;
   the collector of said second transistor of said preamplifier being connected to the emitter of said first and second transistors of said second logarithmic circuit;
   the collector of said first transistor of said second logarithmic circuit being connected to the base of said second transistor of said second logarithmic circuit; and
   the anode of the diode of said second logarithmic circuit being connected to the emitters of said first and second transistors of said logarithmic circuit and the cathode of said diode being connected to ground.

References Cited

UNITED STATES PATENTS

| 2,975,369 | 3/1961 | Vance | 328—143 |
| 3,089,093 | 5/1963 | Rochester | 328—104 XR |
| 3,234,404 | 2/1966 | Peters | 328—143 XR |
| 3,317,747 | 5/1967 | Bryant | 328—117 XR |

DONALD D. FORRER, Primary Examiner

S. T. KRAWCZEWICZ, Assistant Examiner

U.S. Cl. X.R.

307—235, 242; 328—104, 117, 143, 145, 154, 172